United States Patent
Wu

(10) Patent No.: US 10,745,291 B2
(45) Date of Patent: Aug. 18, 2020

(54) METHOD FOR PROCESSING WATER AND CONTROL APPARATUS

(71) Applicant: Beijing Xiaomi Mobile Software Co., Ltd., Beijing (CN)

(72) Inventor: Ke Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 118 days.

(21) Appl. No.: 15/926,713

(22) Filed: Mar. 20, 2018

(65) Prior Publication Data

US 2018/0273397 A1    Sep. 27, 2018

(30) Foreign Application Priority Data

Mar. 21, 2017 (CN) .......................... 2017 1 0169946

(51) Int. Cl.
*C02F 1/00* (2006.01)
*G06Q 50/06* (2012.01)
(Continued)

(52) U.S. Cl.
CPC ............... *C02F 1/001* (2013.01); *B67D 7/30* (2013.01); *B67D 7/766* (2013.01); *C02F 1/008* (2013.01);
(Continued)

(58) Field of Classification Search
CPC ...... B01D 17/12; B01D 29/60; B01D 29/605; B01D 35/04; B01D 35/157;
(Continued)

(56) References Cited

U.S. PATENT DOCUMENTS 6,613,236 B1 *  9/2003  Guess .................. B01D 35/143
                                                210/739
9,776,888 B1 * 10/2017  Kurani .................... C02F 1/008
(Continued)

FOREIGN PATENT DOCUMENTS

CN    105036207 A    11/2015
CN    105135686 A    12/2015
(Continued)

OTHER PUBLICATIONS

State Intellectual Property Office of the People's Republic of China, First Office Action and Search Report Issued in Application No. 201710169946.4, dated Jun. 4, 2019, 30 pages,(Submitted with Machine Translation).
(Continued)

*Primary Examiner* — Joseph W Drodge
(74) *Attorney, Agent, or Firm* — Arch & Lake LLP

(57) ABSTRACT

A method for processing water and a control apparatus are provided. According to the method, a processor in communication with an apparatus for processing water may determine a water usage amount for an object; determine water usage time for the object; calculate time required for water preparation according to the water usage amount, a water preparation speed of the apparatus for processing water and a current amount of residual water; and determine time of starting water preparation according to the time required for water preparation and the water usage time.

14 Claims, 4 Drawing Sheets

(51) Int. Cl.
| | |
|---|---|
| *G06Q 10/10* | (2012.01) |
| *G05D 23/00* | (2006.01) |
| *F24D 19/10* | (2006.01) |
| *G06F 3/00* | (2006.01) |
| *B67D 7/30* | (2010.01) |
| *B67D 7/76* | (2010.01) |
| *G06F 9/448* | (2018.01) |
| *G06F 3/0488* | (2013.01) |
| *G06F 3/12* | (2006.01) |
| *C02F 101/20* | (2006.01) |

(52) U.S. Cl.
CPC ......... *F24D 19/1051* (2013.01); *G05D 23/00* (2013.01); *G06F 3/0488* (2013.01); *G06F 3/122* (2013.01); *G06F 9/4482* (2018.02); *G06Q 10/109* (2013.01); *G06Q 50/06* (2013.01); *C02F 2101/20* (2013.01); *C02F 2209/008* (2013.01); *C02F 2209/40* (2013.01); *C02F 2209/44* (2013.01); *C02F 2303/02* (2013.01); *C02F 2303/04* (2013.01)

(58) Field of Classification Search
CPC .... B01D 35/1573; B01D 36/00; B01D 36/02; B01D 37/04; B01D 37/041; B01D 37/045; B01D 61/10; B01D 61/122; B01D 2201/16; B01D 2201/165; B01D 2201/167; B01D 2201/54; B01D 2201/56; B01D 2221/02; B01D 2311/00; B01D 2311/04; B01D 2311/26; B01D 2311/2649; B01D 61/12; B01D 61/22; B01D 2201/52; B01D 2311/02; B67D 3/00; B67D 3/0003; B67D 3/0077; B67D 3/0093; B67D 3/76; B67D 3/766; B67D 2210/00002; B67D 2210/00005; B67D 2210/0001; B67D 2210/00013; B67D 2210/00018; B67D 7/08; B67D 7/22; B67D 7/30; B67D 7/76; B67D 7/766; B67D 7/78; B67D 7/221; B67D 7/222; B67D 7/56; B67D 7/565; C02F 1/001; C02F 1/003; C02F 1/008; C02F 1/281; C02F 1/283; C02F 1/286; C02F 1/44; C02F 1/441; C02F 1/446; C02F 9/00; C02F 2101/20; C02F 2201/005; C02F 2301/04; C02F 2304/04; C02F 2301/22; C02F 2307/06; C02F 2307/10; C02F 2209/00; C02F 2209/005; C02F 2209/006; C02F 2209/40; C02F 2209/42; C02F 2209/44; C02F 2209/008; C02F 2303/02; C02F 2303/04; C02F 1/00; C02F 2303/20; C02F 2303/185; C02F 2303/22; C02F 2101/2201; C02F 2101/005; C02F 2303/10; C02F 2209/445; F15B 13/10; F15D 1/14; F16K 31/00; F16K 31/02; H04L 12/4625; G05D 7/06; G05D 7/0617; G05D 23/00; G05B 2219/2605; G05B 2219/2613; G05B 2219/2642; G06F 3/0488; G06F 9/4482; G06F 3/122; F24D 19/1051; G06Q 10/109; G06Q 50/06; B05B 12/004; G01F 13/006; G01F 15/06; G01F 15/061; G01F 15/063; G01F 15/07; G01F 15/075; G01F 15/0755; G01F 15/12
USPC ....... 137/551, 552, 559, 562, 603, 605, 801, 137/861, 883; 210/85, 87, 91, 94, 96.1, 210/96.2, 138, 143, 418, 420, 422, 424, 210/449, 739, 741, 744, 745; 222/23, 25, 222/28, 30, 52, 61, 64, 71, 481–485, 222/638–642
See application file for complete search history.

(56) References Cited

U.S. PATENT DOCUMENTS

| | | | |
|---|---|---|---|
| 2005/0087260 A1* | 4/2005 | Marszalec | B01D 29/07 141/286 |
| 2006/0163165 A1* | 7/2006 | Frank | C02F 1/008 210/739 |
| 2007/0012628 A1* | 1/2007 | Frank | C02F 1/008 210/668 |
| 2008/0078710 A1* | 4/2008 | Larkner | C02F 1/008 210/109 |
| 2008/0078723 A1* | 4/2008 | Larkner | C02F 1/006 210/739 |
| 2009/0209285 A1* | 8/2009 | McMahan | H04M 1/67 455/556.1 |
| 2010/0006513 A1* | 1/2010 | Fishler | B01F 1/0022 210/755 |
| 2011/0226684 A1* | 9/2011 | Underwood | G05B 15/02 210/141 |
| 2011/0284436 A1* | 11/2011 | Shin | C02F 9/005 210/143 |
| 2014/0207282 A1* | 7/2014 | Angle | H04L 12/2809 700/257 |
| 2014/0216071 A1* | 8/2014 | Broadbent | H04L 12/281 62/66 |
| 2014/0324223 A1* | 10/2014 | Kobayashi | G05B 15/02 700/275 |
| 2015/0049189 A1* | 2/2015 | Yau | G08B 13/19697 348/143 |
| 2015/0332181 A1* | 11/2015 | Underwood | C02F 9/00 705/7.12 |
| 2016/0085220 A1* | 3/2016 | Yang | G05B 15/02 700/275 |

FOREIGN PATENT DOCUMENTS

| | | |
|---|---|---|
| CN | 105785803 A | 7/2016 |
| CN | 105917172 A | 8/2016 |
| CN | 106969507 A | 7/2017 |
| WO | 2015121856 A1 | 8/2015 |
| WO | 2016193928 A1 | 12/2016 |

OTHER PUBLICATIONS

European Search Report mailed in corresponding EP Patent Application No. 18162890.0 dated May 30, 2018, 6 pages.
Second Office Action issued in Chinese Application No. 201710169946.4 dated Feb. 6, 2020 with English translation, (30p).

* cited by examiner

METHOD FOR PROCESSING WATER AND CONTROL APPARATUS

CROSS REFERENCE TO RELATED APPLICATION

This patent application claims the priority to the Chinese Patent Application No. 201710169946.4 entitled "METHOD AND APPARATUS FOR AUTOMATIC WATER PREPARATION AND INTELLIGENT WATER PURIFIER" filed on Mar. 21, 2017, the entire content of which is incorporated herein by reference.

TECHNICAL FIELD

The present disclosure generally relates to the field of intelligent device technologies, and more particularly, to a method for processing water and a control apparatus.

BACKGROUND

Also referred to as a water purification machine or a water filter, a water purifier is a water processing device for carrying out depth-type filtration and purification on water according to requirements for quality of water. The water purifier can effectively filter ion rusts, sandstones, colloid and chemical agents for adsorbing residual chlorine, taste, odor, hetercolour, pesticides and the like in water, and can effectively remove bacteria, impurities, toxins, heavy metals and the like in water. As a health-related product, the water purifier is favored by more and more consumers.

The water purifier can filter tap water to obtain pure water, and users may store pure water in advance according to the needs. However, if the amount of stored water is far larger than the amount of required water, when the users use water the next day, the pure water stored overnight is not suitable for drinking. Therefore, it is required to consider how to properly store a suitable amount of pure water.

SUMMARY

The present disclosure may provide a method for processing water and a control apparatus.

According to a first aspect of examples of the present disclosure, there is provided a method for processing water. The method may include:

determining, by a processor in communication with an apparatus for processing water, a water usage amount for an object;

determining, by the processor, water usage time for the object;

calculating, by the processor, time required for water preparation according to the water usage amount, a water preparation speed of the apparatus for processing water and a current amount of residual water; and determining, by the processor, time of starting water preparation according to the time required for water preparation and the water usage time.

According to a second aspect of the examples of the present disclosure, there is provided a control apparatus applied to an apparatus for processing water. The control apparatus may include:

a processor, and a machine-readable storage medium, configured to store processor-executable instructions, by executing the executable instructions, the processor is caused to:

determine a water usage amount for an object;

determine water usage time for the object;

calculate time required for water preparation according to the water usage amount, a water preparation speed of the apparatus for processing water and a current amount of residual water; and determine time of starting water preparation according to the time required for water preparation and the water usage time.

It is to be understood that both the foregoing general description and the following detailed description are exemplary and explanatory only and are not restrictive of the present disclosure.

BRIEF DESCRIPTION OF DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the disclosure as recited in the appended claims.

Figure 1:
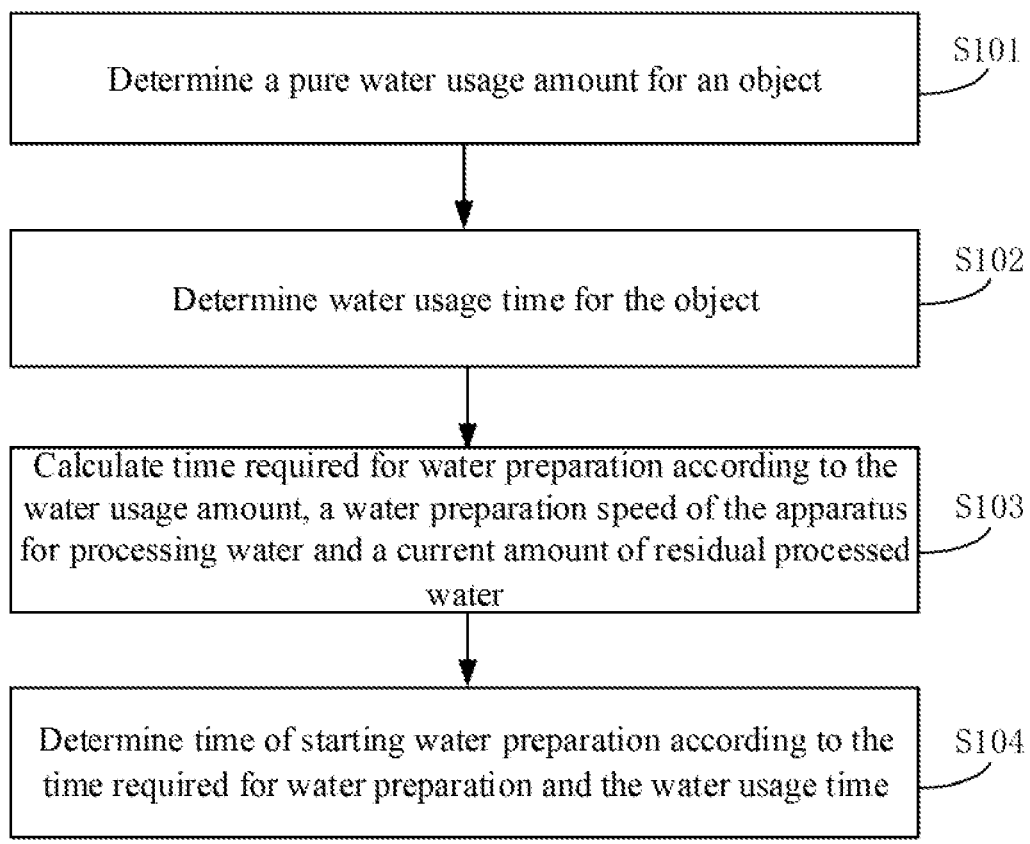
FIG. 1 is a flow chart showing a method for water preparation according to an example.

FIG. 1 is a flow chart showing a method for water preparation according to an example. As shown in FIG. 1, the method for water preparation may be applied to a processor in communication with an apparatus for processing water such as an intelligent water purifier. The method for water preparation may include following blocks S101-S104.

At block S101, a water usage amount for an object may be determined. The water usage amount may indicate how much processed water the object consumes during a preset time period. The processed water is water processed by the apparatus. For example, the processed water may be pure water from an intelligent water purifier. In another example, the processed water may be hot water from an intelligent water heater.

The object may be a group of users using the water-processing apparatus. For example, the object may be, but not limited to, a family, a working group, a team sharing a same office, or any group of people sharing a residence, etc.

In this example, a water usage amount for the object may be determined in a variety of ways. For example, an average water usage amount for the object may be calculated by means of a historical water usage amount for the object, and the average water usage amount may be determined as the pure water usage amount for the object.

At block S102, water usage time for the object may be determined. The water usage time may indicate when the object may start to use the processed water.

In this example, the pure water usage time for the object may be determined in a variety of ways. For example, the pure water usage time for the object may be determined in the following ways.

In the first way, a distance between a current location of a user terminal corresponding to the object and a destination as well as a movement velocity may be acquired from a server, time required for the user terminal to reach the destination may be calculated according to the distance and the movement velocity, and the calculated time may be determined as the pure water usage time for the object.

For example, the processor may acquire, from the server, data required to calculate time for the current user to reach home, calculate the time to reach home according to the data, and determine the time to reach home as the pure water usage time for a family of the current user.

In the second way, a time query request may be sent to a user terminal corresponding to the object, a time query response returned by the user terminal may be received, and time carried in the time query response may be determined as the pure water usage time for the object.

For example, a mobile phone of the user may calculate the time to reach home according to a distance from the current location of the user to home as well as the traffic congestion, and may feed the time to reach home back to the processor after receiving the time query request of the processor.

In the third way, latest pure water usage time for the object may be determined based on historical usage time, and the latest pure water usage time may be determined as the pure water usage time for the object.

Supposing it is Tuesday today, the latest pure water usage time for a current family on last Tuesday may be acquired and determined as the pure water usage time of today. Alternatively, the latest pure water usage time every Tuesday within the latest three months may be acquired from the server, and an average value thereof may be calculated and determined as the pure water usage time today.

In the fourth way, earliest pure water usage time for the object may be determined based on historical usage time, and the earliest pure water usage time may be determined as the pure water usage time for the object.

Supposing it is Friday today, the earliest pure water usage time for a current family on last Friday may be acquired and determined as pure water usage time today. Alternatively, the earliest pure water usage time every Friday within the latest three months may be acquired from the server, and an average value thereof may be calculated and determined as the pure water usage time today.

At block S103, time required for water preparation may be calculated according to the water usage amount, a water preparation speed of the apparatus for processing water and a current amount of residual water. For example, the residual water may indicate how much processed water are available to be used immediately. The processed water may be pure water or heated water.

Supposing the water preparation speed of an intelligent water purifier is 0.1 L/min, if the amount of residual pure water of a current water tank is 0.5 L and the pure water usage amount for the current family today is 3 L, the time required for water preparation is: (3~0.5)/0.1=25 minutes.

At block S104, time of starting water preparation may be determined according to the time required for water preparation and the water usage time.

Continuing the description with the above example, the intelligent water purifier needs to start water preparation 25 minutes prior to the pure water usage time, so that the obtained amount of pure water may meet the current needs of the object, without too much pure water remained.

Figure 2:
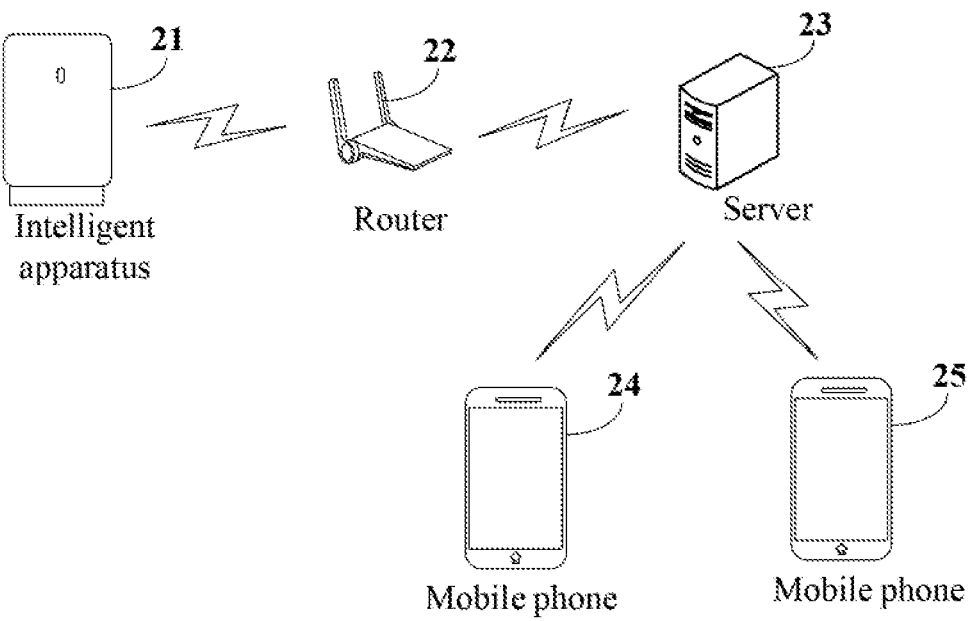
FIG. 2 is a scene graph showing a method for water preparation according to an example.

Exemplary description of the present disclosure may be made with reference to FIG. 2. As shown in FIG. 2, an intelligent apparatus 21 of the current family may be connected to a server 23 via a router 22, and a mobile phone 24 of a user 1 and a mobile phone 25 of a user 2 in the current family may both be connected to the server 23. The intelligent apparatus may be an intelligent water purifier, an intelligent water heater, or other water processing device.

In one example, the intelligent apparatus 21 may be an intelligent water purifier, which may calculate, according to the historical water usage amount for the current family, that an average water usage amount thereof is a (L), and determine the average water usage amount as the pure water usage amount for the current family, that is, the pure water usage amount for the current family is a (L). The intelligent apparatus 21 may obtain, by interacting with the mobile phone 24, that the time for the user 1 to reach home is 5 pm, and may obtain, by interacting with the mobile phone 25, that the time for the user 2 to reach home is 6 pm. The 5 pm may be determined as the pure water usage time for the current family because the 5 pm is earlier than the 6 pm. Supposing the water preparation speed of the intelligent apparatus 21 is 0.1 L/min, time required for water preparation is (a~b)/0.1 min if the amount of residual pure water of the current water tank is b (L), and the intelligent apparatus 21 needs to start water preparation (a~b)/0.1 min prior to 5 pm, so that a proper amount of processed water may be obtained.

According to the above example of the method for processing water, time required for water preparation may be calculated according to the determined pure water usage amount, a water preparation speed of the apparatus for processing water and a current amount of residual pure water. Time of starting water preparation may be determined according to the time required for water preparation and the pure water usage time, and then water may be prepared since the time of starting water preparation. In this way, an appropriate amount of pure water may be obtained, thereby better meeting needs of the current object, and improving the use experience of the user.

Figure 3:
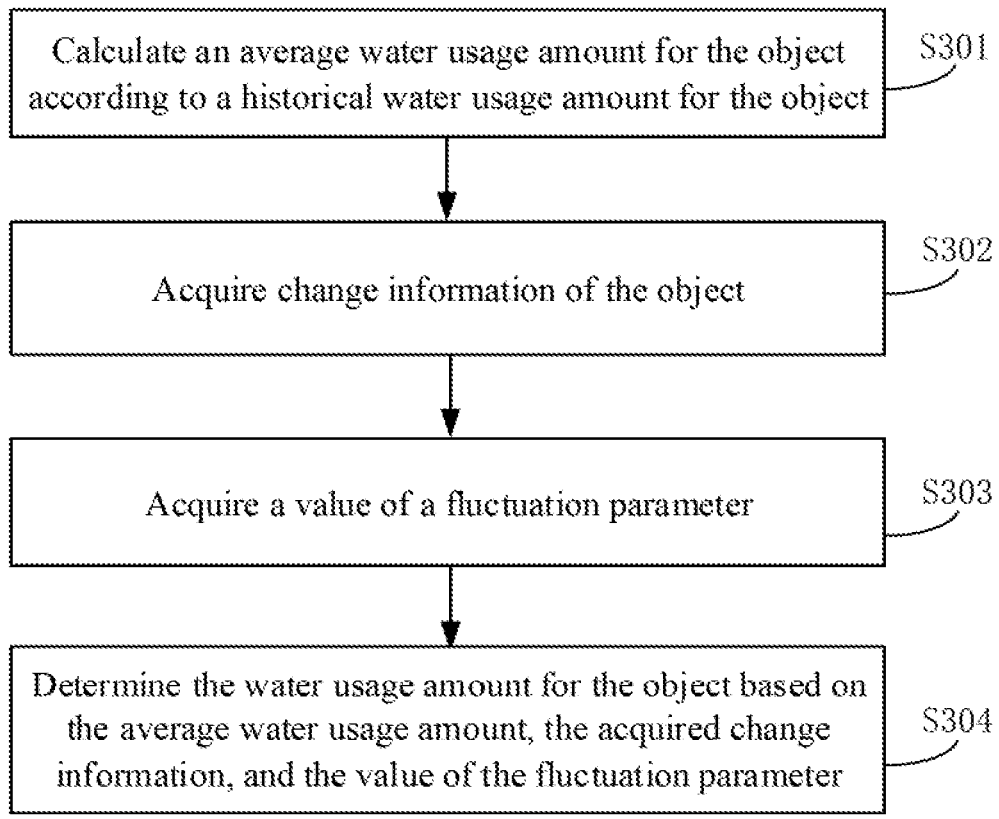
FIG. 3 is a flow chart of determining a water usage amount of an object shown according to an example.

FIG. 3 is a flowchart of determining a pure water usage amount for an object shown according to an example. As shown in FIG. 3, following blocks S301-S304 may be included.

At block S301, an average water usage amount for the object may be calculated according to a historical water usage amount for the object.

At block S302, change information of the object may be acquired.

The change information of the object may include but be not limited to a change of the number of members in the object. For example, when the object is a family, the change information may indicate the current family members staying at the home.

In this example, the intelligent water purifier may read preset data of each user terminal corresponding to the object, and determine the change information of the number of members of the object according to the preset data.

In an example, the intelligent water purifier may learn travel data corresponding to each user by reading application program data of the user terminal and then determine the change information of the number of members of the current object according to the travel data corresponding to each user.

For example, the intelligent water purifier may read outlook calendar information of a mobile phone or computer of each user in the current family, learn the travel data of the user according to the outlook calendar information, determine whether the user will go on a business trip and the business trip time according to the travel data of the user, and then determine whether the number of members in the current residence changes.

At block S303, a value of a fluctuation parameter of the pure water usage amount may be acquired.

Since the water usage amount of each family has a small fluctuation, the value of the fluctuation parameter may be acquired to determine the current pure water usage amount for the object according to the value of the fluctuation parameter.

In this example, the intelligent water purifier may receive the value of the fluctuation parameter manually inputted by the user and also may calculate the value of the fluctuation parameter according to historical statistics information.

Calculating the value of the fluctuation parameter value according to the historical statistics information may specifically include determining the value of the fluctuation parameter according to fluctuation of historical water usage amounts for users within this region and degrees of deviation from an average value.

At block S304, the pure water usage amount for the object may be determined based on the average water usage amount for the object, the change information of the object, and the value of the fluctuation parameter.

In this example, after acquiring the change information of the object, the average water usage amount for the object may be adjusted according to the change information, and then the pure water usage amount for the object may be determined based on the adjusted average water usage amount for the object and the value of the fluctuation parameter, so that the determined pure water usage amount for the object is more accurate.

According to the above example, the pure water usage amount for the object may be determined by acquiring change information and a value of a fluctuation parameter for the object, so that the determined pure water usage amount for the object is more accurate, thereby providing conditions for subsequently preparing a proper amount of pure water.

Corresponding to the example of the above method for processing water, the present disclosure may also provide an example of a control apparatus.

Figure 4:
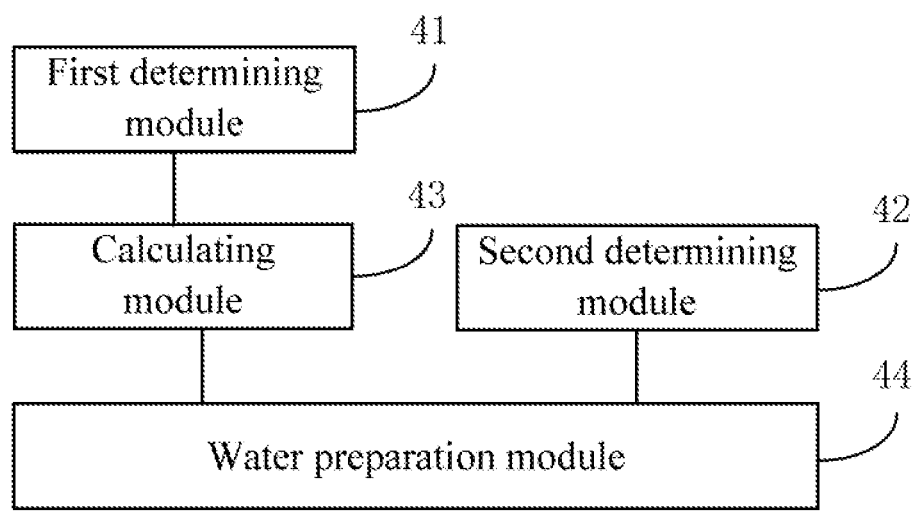
FIG. 4 is a block diagram of a control apparatus shown according to an example.

FIG. 4 is a block diagram of a control apparatus according to an example. As shown in FIG. 4, the control apparatus may be applied to an apparatus for processing water such as an intelligent water purifier. The control apparatus may include: a first determining module 41, a second determining module 42, a calculating module 43, and a water preparation module 44.

The first determining module 41 may be configured to determine a pure water usage amount for an object.

The object may be, but not limited to, a family.

In this example, a pure water usage amount of the object may be determined in a variety of ways. For example, an average water usage amount for the object may be calculated by means of a historical water usage amount for the object, and the average water usage amount may be determined as the pure water usage amount for the object.

The second determining module 42 may be configured to determine pure water usage time for the object.

In this example, the pure water usage time for the object may be determined in a variety of ways. For example, the pure water usage time for the object may be determined in the following ways.

In the first way, a distance between a current location of a user terminal corresponding to the object and a destination as well as a movement velocity may be acquired from a server, time required for the user terminal to reach the destination may be calculated according to the distance and the movement velocity, and the calculated time may be determined as the pure water usage time for the object.

In the second way, a time query request may be sent to a user terminal corresponding to the object, a time query response returned by the user terminal may be received, and time carried in the time query response may be determined as the pure water usage time for the object.

In the third way, latest pure water usage time for the object may be determined based on historical usage time, and the latest pure water usage time may be determined as the pure water usage time for the object.

In the fourth way, earliest pure water usage time for the object may be determined based on historical usage time, and the earliest pure water usage time may be determined as the pure water usage time for the object.

The calculating module 43 may be configured to calculate time required for water preparation according to the pure water usage amount determined by the first determining module 41, a water preparation speed of the apparatus for processing water and a current amount of residual pure water.

Supposing the water preparation speed of an intelligent water purifier is 0.1 L/min, if the amount of residual pure water of a current water tank is 0.5 L and the pure water usage amount of the current family today is 3 L, the time required for water preparation is: (3~0.5)/0.1=25 minutes.

The water preparation module 44 may be configured to determine time of starting water preparation according to the time required for water preparation calculated by the calculating module 43 and the pure water usage time determined by the second determining module 42.

Continuing the description with the above example, the intelligent water purifier may start water preparation 25 minutes prior to the pure water usage time, so that the obtained amount of pure water may meet the current needs of the object, without too much pure water remained.

The apparatus as shown in FIG. 4 may be configured to implement the disclosed methods, with the same description of related content, and thus is not unnecessarily described herein.

According to the above example of the control apparatus, time required for water preparation may be calculated according to the pure water usage amount, a water preparation speed of the apparatus for processing water and a current amount of residual pure water. Time of starting water preparation may be determined according to the time required for water preparation and the pure water usage time, and then water may be prepared since the time of starting water preparation. In this way, an appropriate amount of pure water may be obtained, thereby better meeting current needs of the object, and improving the use experience of the user.

Figure 5:
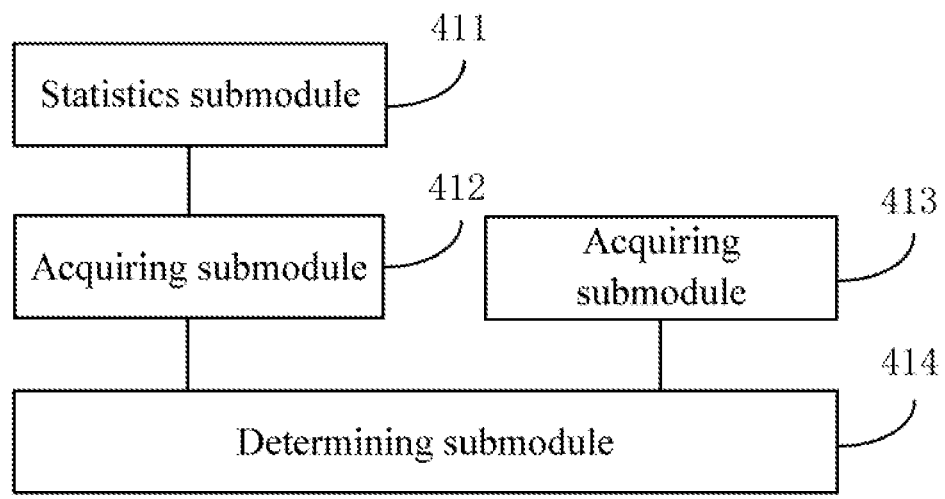
FIG. 5 is a block diagram of another control apparatus shown according to an example.

FIG. 5 is a block diagram of another control apparatus shown according to an example. As shown in FIG. 5, on the basis of the example as shown in FIG. 4, the first determining module 41 may include: a statistics submodule 411, an acquiring submodule 412, an acquiring submodule 413, and a determining submodule 414.

The statistics submodule 411 may be configured to calculate the average water usage amount for the object.

The acquiring submodule 412 may be configured to acquire change information of the object.

The change information of the object may include but be not limited to change of the number of family members.

In this example, the control apparatus may read preset data of each user terminal corresponding to the object, and determine the change information on the number of members of the object according to the preset data.

For example, the control apparatus may read outlook calendar information of a mobile phone or computer of each user in the current family, learn the travel data of the user according to the outlook calendar information, determine whether the user will go on a business trip and the business trip time according to the travel data of the user, and then determine whether the number of members in the current family changes.

The acquiring submodule 413 may be configured to acquire a value of a fluctuation parameter of the pure water usage amount.

Since the water usage amount of each family has small fluctuation, the value of the fluctuation parameter may be acquired to determine the pure water usage amount for the current object according to the value of the fluctuation parameter.

In this example, the control apparatus may receive the value of the fluctuation parameter manually inputted by the user and also may calculate the value of the fluctuation parameter according to historical statistics information.

Calculating the value of the fluctuation parameter according to the historical statistics information may specifically include determining the value of the fluctuation parameter according to fluctuation of historical water usage amounts of users within this region and degrees of deviation from an average value.

The determining submodule 414 may be configured to determine the pure water usage amount for the object based on the average water usage amount calculated by the statistics submodule 411, the change information of the object acquired by the acquiring submodule 412, and the value of the fluctuation parameter acquired by the acquiring submodule 413.

In this example, after acquiring the change information of the object, the average water usage amount for the object may be adjusted according to the change information, and then the pure water usage amount for the object may be determined based on the adjusted average water usage amount for the object and the value of the fluctuation parameter, so that the determined pure water usage amount for the object is more accurate.

The apparatus as shown in FIG. 5 is configured to implement the method flow as shown in FIG. 3, with the same description of related content, and thus is not unnecessarily described herein.

According to the above example, the pure water usage amount for the object may be determined by acquiring change information and a value of a fluctuation parameter of the object, so that the determined pure water usage amount for the object is more accurate, thereby providing conditions for subsequently preparing a proper amount of pure water.

Figure 6:
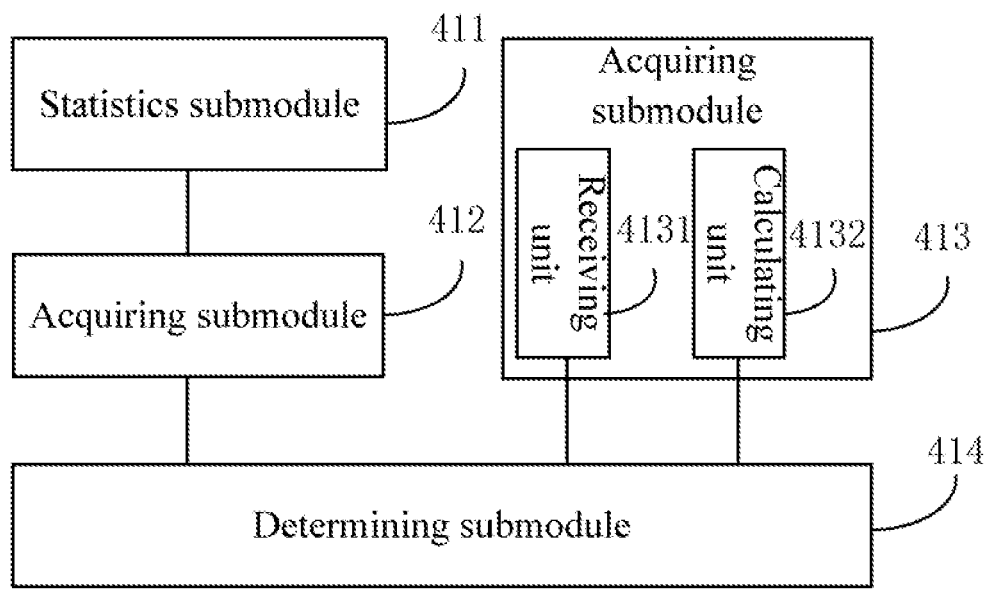
FIG. 6 is a block diagram of another control apparatus shown according to an example.

FIG. 6 is a block diagram of another control apparatus shown according to an example. As shown in FIG. 6, on the basis of the example as shown in FIG. 5, the acquiring submodule 413 may include at least one of a receiving unit 4131 and a calculating unit 4132.

The receiving unit 4131 may be configured to receive a value of a fluctuation parameter inputted by a user.

The calculating unit 4132 may be configured to calculate the value of the fluctuation parameter according to historical statistics information.

Since the water usage amount for each family has small fluctuation, a value of a fluctuation parameter may be acquired to determine the pure water usage amount for the current object according to the value of the fluctuation parameter.

In this example, the value of the fluctuation parameter manually inputted by the user may be received, and also the value of the fluctuation parameter may be calculated according to historical statistics information.

Calculating the value of the fluctuation parameter according to the historical statistics information may specifically include determining the value of the fluctuation parameter according to fluctuation of historical water usage amounts of users within this region and a degree of deviation from an average value.

The apparatus as shown in FIG. 6 may be configured to implement the method flow as shown in FIG. 3, with the same description of related content, and thus is not unnecessarily described herein.

According to the above example, the value of the fluctuation parameter manually inputted by the user may be received, or the value of the fluctuation parameter may be calculated according to historical statistics information, the implementation being flexible and diversified.

Figure 7:
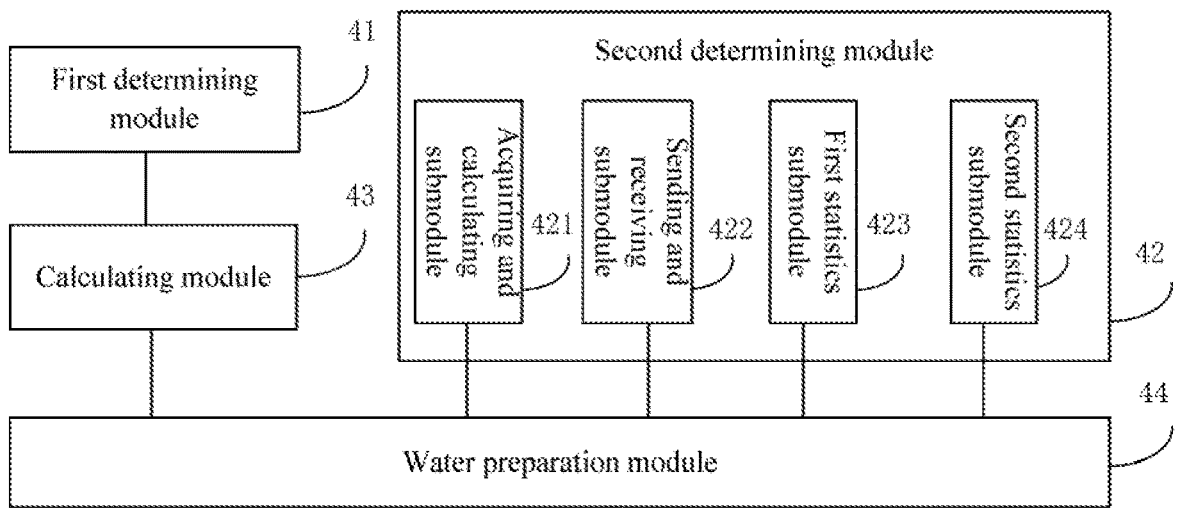
FIG. 7 is a block diagram of another control apparatus shown according to an example.

FIG. 7 is a block diagram of another control apparatus shown according to an example. As shown in FIG. 7, on the basis of the example as shown in FIG. 4, the second determining module 42 may include: an acquiring and calculating submodule 421, a sending and receiving submodule 422, and either one of a first statistics submodule 423 and a second statistics submodule 424.

The acquiring and calculating submodule 421 may be configured to acquire, from a server, a distance between a current location of a user terminal corresponding to the object and a destination as well as a movement velocity, calculate time for the user terminal to reach the destination according to the distance and the movement velocity, and determine the calculated time as the pure water usage time for the object.

For example, the control apparatus may acquire, from the server, data required to calculate time for the current user to reach home, calculate the time to reach home according to the data, and determine the time to reach home for the current user as the pure water usage time for a family of the current user.

The sending and receiving submodule 422 may be configured to send a time query request to a user terminal corresponding to the object, receive a time query response returned by the user terminal, and determine time carried in the time query response as the pure water usage time for the object.

For example, a mobile phone of the user may calculate the time to reach home according to a distance from the current location of the user to home as well as the traffic congestion.

Alternatively or additionally, the mobile phone may feed the time to reach home back to the control apparatus after receiving the time query request of the intelligent water purifier.

The first statistics submodule 423 may be configured to determine latest pure water usage time for the object based on historical usage time, and to determine the latest pure water usage time as the pure water usage time for the object.

Supposing it is Tuesday today, the latest pure water usage time for a current family on last Tuesday may be acquired and determined as pure water usage time today. Alternatively, the latest pure water usage time every Tuesday within the latest three months may be acquired from the server, and an average value thereof may be calculated and determined as the pure water usage time today.

The second statistics submodule 424 may be configured to determine earliest pure water usage time for the object based on the historical usage time, and to determine the earliest pure water usage time as the pure water usage time for the object.

Supposing it is Friday today, the earliest pure water usage time for a current family on last Friday may be acquired and determined as pure water usage time today. Alternatively, the earliest pure water usage time every Friday within the latest three months may be acquired from the server, and an average value thereof may be calculated and determined as the pure water usage time today.

The apparatus as shown in FIG. 7 may be configured to implement the method flow as shown in FIG. 1, with the same description of related content, and thus is not unnecessarily described herein.

In the above example, the pure water usage time for the object may be determined in a variety of ways, with flexible and diverse implementations.

With regard to the apparatus in the above examples, detailed description of specific modes for executing operations of modules and submodules has been made in the examples related to the method, and thus no detailed illustration will be made herein.

Figure 8:
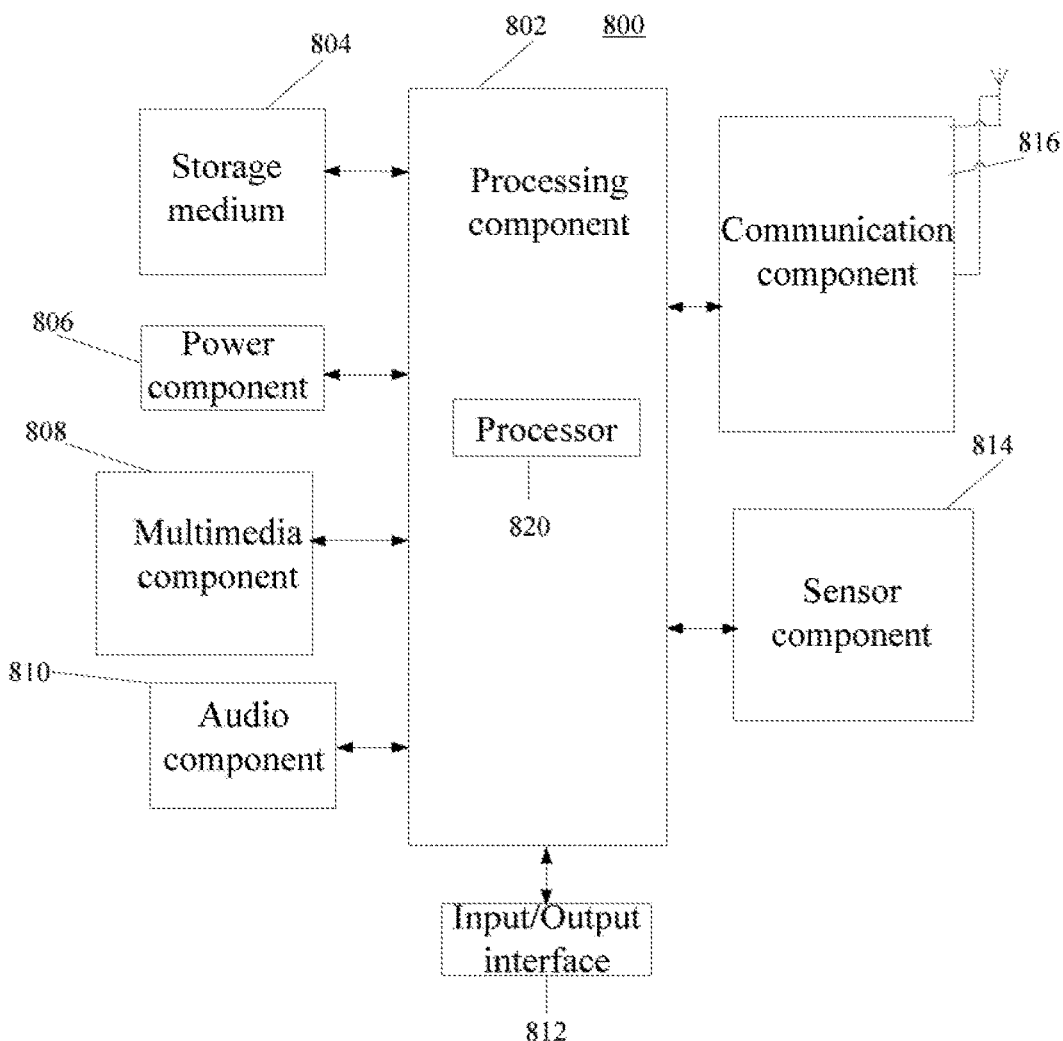
FIG. 8 is a block diagram of a control apparatus shown according to an example.

FIG. 8 is a block diagram of a control apparatus shown according to an example. For example, the apparatus 800 may be a mobile phone, a computer, a digital broadcast terminal, a message transceiver device, a game console, a tablet device, a medical device, a fitness device, a personal digital assistant, an aircraft, and the like.

Referring to FIG. 8, the apparatus 800 may include one or more of the following components: a processing component 802, a storage medium 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the blocks in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The storage medium 804 is configured to store various types of data to support the operation of the apparatus 800. Examples of such data include instructions for any applications or methods operated on the apparatus 800, contact data, phonebook data, messages, pictures, video, etc. The storage medium 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some examples, the screen may include a liquid crystal display (LCD) and a touch panel (TP). If the screen includes the touch panel, the screen may be implemented as a touch screen to receive input signals from the user. The touch panel may include one or more touch sensors to sense touches, slips, and gestures on the touch panel. The touch sensors may not only sense a boundary of a touch or slip action, but also sense a period of time and a pressure associated with the touch or slip action. In some examples, the multimedia component 808 may include a front camera and/or a rear camera. The front camera and/or the rear camera may receive external multimedia data while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800X or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one example, the communication component 816 may receive a broadcast signal or broadcast associated information from an external broadcast management system via a broadcast channel. In one example, the communication component 816 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory machine-readable storage medium including instructions, such as included in the storage medium 804, executable by the processor 820 in the apparatus 800, for performing the above-described methods. For example, the non-transitory machine-readable storage medium may be a ROM, a RAM, a CD-ROM, a magnetic tape, a floppy disc, an optical data storage device, and the like.

According to an example of the present disclosure, a control apparatus applied to an apparatus for processing water may include:

a processor, and a machine-readable storage medium, configured to store processor-executable instructions, by executing the executable instructions, the processor is caused to:

determine a pure water usage amount for an object;

determine pure water usage time for the object;

calculate time required for water preparation according to the pure water usage amount, a water preparation speed of the apparatus for processing water and a current amount of residual pure water; and determine time of starting water preparation according to the time required for water preparation and the pure water usage time.

When determining the pure water usage amount for an object, the processor is caused to:

calculate an average water usage amount for the object according to a historical water usage amount for the object;

acquire change information of the object:

acquire a value of a fluctuation parameter of the pure water usage amount; and determine the pure water usage amount for the object based on the average water usage amount for the object, the change information and the value of the fluctuation parameter.

When acquiring change information of the object, the processor is caused to:

read preset data of a user terminal corresponding to each member of the object; and determine change information on the number of the members of the object according to the preset data.

When acquiring the value of the fluctuation parameter of the pure water usage amount, the processor is caused to:

receive the value of the fluctuation parameter inputted by a user corresponding to the object; or calculate the value of the fluctuation parameter according to historical statistics information.

When determining pure water usage time for the object, the processor is caused to:

acquire, from a server, a distance between a current location of a user terminal corresponding to the object and a destination as well as a movement velocity, calculate time for the user terminal to reach the destination according to the distance and the movement velocity, and determine the calculated time as the pure water usage time for the object.

When determining pure water usage time for the object, the processor is caused to:

send a time query request to a user terminal corresponding to the object, receive a time query response returned by the user terminal, and determine time carried in the time query response as the pure water usage time for the object.

When determining pure water usage time for the object, the processor is caused to:

determine latest pure water usage time for the object based on historical usage time, and determine the latest pure water usage time as the pure water usage time for the object.

When determining pure water usage time for the object, the processor is caused to:

determine earliest pure water usage time for the object based on historical usage time, and determine the earliest pure water usage time as the pure water usage time for the object.

The technical solution provided by the example of the present disclosure may have the following beneficial effects: time required for water preparation may be calculated according to the pure water usage amount, a water preparation speed of the apparatus for processing water and a current amount of residual pure water, time of starting water preparation may be determined according to the time required for water preparation and the determined pure water usage time, and then water may be prepared since the time of starting water preparation. In this way, an appropriate amount of pure water may be obtained, thereby better meeting current needs of the object, and improving the use experience of the user.

The pure water usage amount for the object may be determined by acquiring change information and a value of a fluctuation parameter of the object, so that the determined pure water usage amount for the object is more accurate, thereby providing conditions for subsequently preparing a proper amount of pure water.

Preset data of each user terminal corresponding to the object may be read, and the change information of the current object may be determined according to the preset data, the implementation being simple.

The value of the fluctuation parameter manually inputted by the user may be received, or the value of the fluctuation parameter may be calculated according to historical statistics information, the implementation being flexible and diversified.

The pure water usage time for the object may be determined in a variety of ways, the implementation being flexible and diversified.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for processing water, comprising:
   determining, by a processor in communication with a water processing apparatus in response to detecting an open status by one or more sensors of the apparatus for processing water, a water usage amount of processed water which is used by an object in connection with the apparatus, wherein the object includes one or more users, and in communication with one or more sensors, including at least one proximity sensor, that are configured to provide the apparatus with status assessments including location and movement of at least one of the users;
   determining, by the processor, water usage time for the object;
   calculating, by the processor, a time required for water preparation according to the water usage amount, a water preparation speed of the apparatus for processing water, and a residual amount of processed water remained in the apparatus; and
   determining, by the processor, a time of starting water preparation according to the time required for water preparation and the water usage time,
   wherein determining the water usage amount of processed water which is used by the object comprises:
      calculating, by the processor, an average water usage amount for the object according to a historical water usage amount for the object;
      acquiring, by the processor, change information reflecting a change of the object, as provided by the one or more sensors including at least one proximity sensor;
      acquiring, by the processor, a value of a fluctuation parameter used to indicate a fluctuation of the water usage amount;
      determining, by the processor, the water usage amount for the object based on the average water usage amount for the object, the change information, and the value of the fluctuation parameter; and
      operatively connecting the processor to the water processing apparatus so as to start processing the water, responsive to the change information, at the determined time, and continue processing the water for the required time, and at the water preparation speed, in order to provide a determined amount of processed water.

2. The method according to claim 1, herein acquiring the change information of the object comprises:
   reading, by the processor, preset data of a user terminal corresponding to each user of the object; and
   determining, by the processor, the change information on a number of the users of the object according to the preset data.

3. The method according to claim 1, wherein acquiring the value of the fluctuation parameter of the water usage amount comprises:
   receiving, by the processor, a value of the fluctuation parameter inputted by a user corresponding to the object; or
   calculating, by the processor, the value of the fluctuation parameter according to historical statistics information.

4. The method according to claim 1, wherein determining the water usage time for the object comprises:
   acquiring, by the processor, a distance between a location of a user terminal corresponding to the object and a destination as well as a movement velocity of the user terminal from a server,
   wherein, the server is in a communication connection with the apparatus for processing water and the user terminal, and
   wherein, the destination indicates a location of the apparatus for processing water;
   calculating, by the processor, time for the user terminal to reach the destination according to the distance and the movement velocity; and
   determining, by the processor, the calculated time as the usage time for the object.

5. The method according to claim 1, wherein determining the water usage time for the object comprises:
   sending, by the processor, a time query request to a user terminal corresponding to the object;
   receiving, by the processor, a time query response returned by the user terminal; and
   determining, by the processor, a time carried in the time query response as being the water usage time for the object.

6. The method according to claim 1, wherein determining the water usage time for the object comprises:
   searching for, by the processor, a latest water usage time for the object from historical information indicating water usage time for the object; and
   determining, by the processor, the latest water usage time as being the water usage time for the object.

7. The method according to claim 1, wherein determining the water usage for the object comprises:
   searching for, by the processor, an earliest water usage time for the object from historical information indicating water usage time for the object; and
   determining, by the processor, the earliest water usage time as being the water usage time for the object.

8. A water processing system, comprising:
   a water processing apparatus for processing water which is used by an object in connection with the apparatus, wherein, the object includes one or more users;
   a processor in operative communication with the apparatus for processing water;
   a machine-readable storage medium, configured to store processor-executable instructions; and
   one or more sensors, including at least one proximity sensor, configured to provide the apparatus with status assessments including location and movement of at least one of the users;

wherein for executing the executable instructions, the processor is configured to perform the following:

determine, in response to detecting an open status by the one or more sensors, a water usage amount of processed water used by the object;

determine water usage time for the object;

calculate a time required for water preparation according to the water usage amount, a water preparation speed of the apparatus for processing water and a residual amount of processed water remained in the apparatus; and determine a time of starting water preparation according to the time required for water preparation and the water usage time, wherein when determining the water usage amount of processed water which is used by the object, the processor is further configured to:

calculate an average water usage amount for the object according to a historical water usage amount for the object;

acquire change information reflecting a change of the object, as provided by the one or more sensors including at least one proximity sensor;

acquire a value of a fluctuation parameter used to indicate a fluctuation of the water usage amount; and determine the water usage amount for the object based on the average water usage amount for the object, the change information and the value of the fluctuation parameter;

and wherein the water processing apparatus is configured to start processing the water, responsive to the change information, at the determined time, and continue processing the water for the required time, and at the water preparation speed, in order to provide a determined amount of processed water.

9. The system according to claim 8, wherein when acquiring the change information of the object, the processor is caused to:

read preset data of a user terminal corresponding to each user of the object; and determine the change information on a number of the users of the object according to the preset data.

10. The system according to claim 8, wherein when acquiring the value of the fluctuation parameter of the water usage amount, the processor is further caused to:

receive a value of the fluctuation parameter inputted by a user corresponding to the object; or calculate the value of the fluctuation parameter according to historical statistics information.

11. The system according to claim 8 wherein when determining the water usage time for the object, the processor is further caused to:

acquire, from a server, a distance between a location of a user terminal corresponding to the object and a destination as well as a movement velocity of the user terminal, wherein, the server is in a communication connection with the apparatus for processing water and the user terminal, and wherein, the destination indicates a location of the apparatus for processing water;

calculate time for the user terminal to reach the destination according to distance and the movement velocity, and determine the calculated time as the water usage time for the object.

12. The system according to claim 8, wherein when determining the water usage time for the object, the processor is further caused to:

send a time query request to a user terminal corresponding to the object; receive a time query response returned by the user terminal; and determine a time carried in the time query response as being the water usage time for the object.

13. The system according to claim 8, wherein when determining the water usage time for the object, the processor is further caused to:

search for a latest water usage time for the object from historical information indicating water usage time for the object, and determine the latest water usage time as being the water usage time for the object.

14. The system according to claim 8, wherein when determining the water usage time for the object, the processor is further caused to:

search for an earliest water usage time for the object from historical information indicating water usage time for the object, and determine the earliest water usage time as being the water usage time for the object.

* * * * *